(12) United States Patent
Ramey et al.

(10) Patent No.: US 10,129,143 B2
(45) Date of Patent: Nov. 13, 2018

(54) BANDWIDTH ON DETERMINISTIC AIRCRAFT DATA NETWORKS

(71) Applicant: The Boeing Company, Chicago, IL (US)

(72) Inventors: Sean M. Ramey, Redmond, WA (US); Timothy E. Jackson, Mukilteo, WA (US); Arnold W. Nordsieck, Bellevue, WA (US); Tuong K. Truong, Redmond, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 15/334,138

(22) Filed: Oct. 25, 2016

(65) Prior Publication Data
US 2018/0115484 A1    Apr. 26, 2018

(51) Int. Cl.
*H04L 12/713*    (2013.01)
*G07C 5/00*    (2006.01)
(Continued)

(52) U.S. Cl.
CPC ............ *H04L 45/586* (2013.01); *G07C 5/008* (2013.01); *H04L 47/805* (2013.01);
(Continued)

(58) Field of Classification Search
CPC ..... H04L 45/586; H04L 67/12; H04L 47/805; G07C 5/008
See application file for complete search history.

(56) References Cited

U.S. PATENT DOCUMENTS

| | | | |
|---|---|---|---|
| 7,929,431 B2* | 4/2011 | Wilt | H04L 47/10 370/229 |
| 8,005,580 B2* | 8/2011 | McAvoy | H02J 3/14 244/53 R |

(Continued)

FOREIGN PATENT DOCUMENTS

EP    3076605 A1    10/2016

OTHER PUBLICATIONS

"European Application Serial No. 17195640.2, Search Report dated Mar. 2, 2018 ", 15 pgs.

(Continued)

*Primary Examiner* — Brian D Nguyen
(74) *Attorney, Agent, or Firm* — Kwan & Olynick LLP (57) ABSTRACT

Provided are mechanisms for improving bandwidth for non-essential data on deterministic aircraft data networks (ADNs) such as ARINC 664 networks. A switch such as an ARINC 664 switch maintains rate constrains on one or more priority levels of traffic while releasing rate constraints on low priority traffic. Low priority traffic can be received at an ARINC 664 switch at rates allowed by an Ethernet physical layer. However, low priority, non-rate constrained traffic is transmitted only when there are no other scheduled messages to send. Low priority traffic can consume all available bandwidth whenever there is slack time. A switch can further be separated into zones including a standard rate constrained zone as well as a rate unconstrained zone. Internal or external cross-links can be provided between the zones for any data that needs to be transferred between zones.

20 Claims, 9 Drawing Sheets

(51) Int. Cl.
    *H04L 29/08*     (2006.01)
    *H04L 12/927*    (2013.01)
    *H04L 12/931*    (2013.01)
    *H04L 12/46*         (2006.01)
    *H04L 12/40*         (2006.01)

(52) U.S. Cl.
    CPC ............ *H04L 49/351* (2013.01); *H04L 67/12*
    (2013.01); *H04L 12/4625* (2013.01); *H04L*
    *2012/4028* (2013.01); *H04L 2012/40208*
    (2013.01)

(56) References Cited

U.S. PATENT DOCUMENTS

| | | | | |
|---|---|---|---|---|
| 2005/0283287 | A1* | 12/2005 | Bauman | G06F 11/32 701/34.2 |
| 2008/0232253 | A1* | 9/2008 | Wilt | H04L 47/10 370/235.1 |
| 2009/0058682 | A1* | 3/2009 | True | H04L 12/66 340/971 |
| 2012/0297108 | A1* | 11/2012 | Mitani | B64D 47/00 710/316 |
| 2016/0294882 | A1* | 10/2016 | Michaels | H04L 65/1013 |
| 2016/0318626 | A1* | 11/2016 | Gansmandel | H04L 12/6418 |
| 2017/0101067 | A1* | 4/2017 | Carleial | B60R 16/03 |
| 2017/0201367 | A1* | 7/2017 | Van Stensel | G06F 3/0607 |

OTHER PUBLICATIONS

Land, Ian et al., "Architecting ARINC 664, Part 7 (AFDX) Solutions", Retrieved from the Internet: http://www.xilinx.com/support/documentation/application notes/xapp1130.pdf, Retrieved on Feb. 22, 2018, May 2009, 25 pgs.

Yao, Jianguo et al., "System-Level Scheduling of Mixed-Criticality Traffics in Avionics Networks", IEEE, vol. 4, 2016, pp. 5880-5888.

* cited by examiner

BANDWIDTH ON DETERMINISTIC AIRCRAFT DATA NETWORKS

BACKGROUND

Conventional deterministic aircraft data networks such as Aeronautical Radio, Incorporated (ARINC) 664 networks include end systems connected via Ethernet physical layers to each other through network switches. These networks are built using virtual links having network pathways and timing constraints for messages on those links. The virtual links have static routing through the network switches from various sources to various destinations. Each link is allocated a given maximum frequency of transmission, and any messages sent faster than allowed are filtered out by the switches.

Deterministic aircraft data networks are effective and reliable for statically configured parametric data transfer. However, they are inefficient for periodic, large block data flows or large file transfers. When large files are transmitted, each message is throttled by the allocated bandwidth on its associated virtual link. Increasing the virtual link allocation is not always feasible as that would interfere with other virtual links even if they are not currently being used. An additional problem is that each physical connection may have a different link speed. If a high bandwidth physical connection is bridged, through a switch, to a lower bandwidth connection, the fastest the data transfer on a given virtual link can occur throughout the network is constrained by the physical connection with the lowest bandwidth for that virtual link.

Bandwidth for these types of transfers could be created by adding an entirely separate physical layer to the airplane dedicated to this traffic. However, that is cost and weight prohibitive in most cases. Consequently, it is desirable to provide improved mechanisms for transmitting data reliably and effectively on deterministic aircraft data networks such as ARINC 664 while minimizing the addition of aircraft switches, end systems, and wiring.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

One example of the present disclosure relates to a technique for handling maintenance traffic. The technique includes receiving maintenance traffic at a maintenance region in an aircraft data network multiple region switch; determining that an endpoint associated with the maintenance traffic at the maintenance region provides insufficient support for maintenance traffic; routing maintenance traffic through cross links to an ARINC 664 region in the aircraft data network multiple region switch; releasing rate constraints for maintenance traffic in the ARINC 664 region; and transmitting maintenance traffic when the ARINC 664 region is free of virtual link traffic, wherein the maintenance traffic is transmitted to the aircraft data network multiple region switch.

In some embodiments, the virtual link traffic received in the ARINC 664 region is rate constrained.

In some embodiments, the virtual link traffic received in the ARINC 664 region is associated with multiple priorities.

In some embodiments, maintenance traffic is associated with a lowest priority.

In some embodiments, the maintenance region transmits maintenance traffic to other endpoints configured to handle maintenance traffic.

In some embodiments, the aircraft data network multiple region switch is configured in a single physical network switch.

In some embodiments, the ARINC 664 region is connected to a plurality of ARINC transmit and receive ports.

In some embodiments, the maintenance region has unconstrained virtual link rates.

In some embodiments, the ARINC 664 region is constrained by a plurality of virtual link rates.

One example of the present disclosure relates to a technique for handling maintenance traffic.

Another example of the present disclosure relates to a system for handling maintenance traffic. The system includes an input interface configured to receive maintenance traffic at a maintenance region in an aircraft data network multiple region switch; a processor configured determine that an endpoint associated with the maintenance traffic at the maintenance region provides insufficient support for maintenance traffic, the processor is further configured to route maintenance traffic through cross links to an ARINC 664 region in the aircraft data network multiple region switch, wherein rate constraints are released for maintenance traffic in the ARINC 664 region; and an output interface configured to transmit maintenance traffic the ARINC 664 region is free of virtual link traffic, wherein the maintenance traffic is transmitted to the aircraft data network multiple region switch.

In some embodiments, the virtual link traffic received in the ARINC 664 region is rate constrained.

In some embodiments, the virtual link traffic received in the ARINC 664 region is associated with multiple priorities.

In some embodiments, maintenance traffic is associated with a lowest priority.

In some embodiments, the maintenance region transmits maintenance traffic to other endpoints configured to handle maintenance traffic.

In some embodiments, the aircraft data network multiple region switch is configured in a single physical network switch.

In some embodiments, the ARINC 664 region is connected to a plurality of ARINC transmit and receive ports.

In some embodiments, the maintenance region has unconstrained virtual link rates.

In some embodiments, the ARINC 664 region is constrained by a plurality of virtual link rates.

One example of the present disclosure relates to a technique for handling maintenance traffic.

Another example of the present disclosure relates to a computer readable medium having computer code for handling maintenance traffic. The computer readable medium includes computer code for receiving maintenance traffic at a maintenance region in an aircraft data network multiple region switch; computer code for determining that an endpoint associated with the maintenance traffic at the maintenance region provides insufficient support for maintenance traffic; computer code for routing maintenance traffic through cross links to an ARINC 664 region in the aircraft data network multiple region switch; computer code for releasing rate constraints for maintenance traffic in the ARINC 664 region; and computer code for transmitting maintenance traffic when the ARINC 664 region is free of virtual link traffic, wherein the maintenance traffic is transmitted to the aircraft data network multiple region switch.

In some embodiments, the computer readable medium comprises computer code for receiving virtual link traffic in the ARINC 664 region, wherein the virtual link traffic received in the ARINC 664 region is rate constrained.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features. These and other embodiments are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular networks, such as ARINC 664 networks used in aircraft environments. However, it should be noted that the techniques and mechanisms of the present disclosure can apply to various other networks. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Provided are mechanisms for improving bandwidth for non-essential data on deterministic aircraft data networks (ADNs) such as ARINC 664 networks. A switch such as an ARINC 664 switch maintains rate constraints on one or more priority levels of traffic while releasing rate constraints on low priority traffic. Low priority traffic can be received at an ARINC 664 switch at rates allowed by an Ethernet physical layer. However, low priority, non-rate constrained traffic is transmitted only when there are no other scheduled messages to send. Low priority traffic can consume all available bandwidth whenever there is slack time. A switch can further be separated into zones including a standard rate constrained zone as well as a non-rate constrained zone. Internal or external cross-links can be provided between the zones for any data that needs to be transferred between zones.

Example Embodiments

Various deterministic aircraft data networks such as ARINC 664 networks provide for data delivery within a reliable, predictable, and specifically timed framework. These networks handle periodic and parametric data transfers of essential, time critical data very well, but are often not particularly well suited for aperiodic bursts of traffic. By contrast, many conventional networking standards such as Ethernet handle aperiodic bursts of traffic well but provide no guarantees of delivery within a particular frame and typically no guarantees of delivery of specific packets. ARINC 664 specifically allows for implementation of a deterministic network using ubiquitous and inexpensive Ethernet hardware by adapting Ethernet to deterministic requirements needed in aircraft data networks. One mechanism for adapting Ethernet for use with deterministic requirements is the virtual link in ARINC 664. Each virtual link specifies a static, logical data path through an ARINC 664 network from a single source to one or more destinations. Virtual link traffic is typically identified using bit sequences in an Ethernet Media Access Control (MAC) destination address, such as the last 16-bit unsigned integer value in a MAC destination address. Virtual links are also specified to transmit at a certain rate. Various transmission media such as fiber optic cables or copper wire can be used. Separate cables or wires may be provided for transmitting and receiving data. ARINC 664 extends conventional Ethernet to provide high data integrity data transmission meeting specific timing requirements.

Rate constrained data received at an ARINC 664 switch conventionally may have one or more preconfigured priorities. However, all data remains rate constrained to ensure that the network meets a designed maximum amount of traffic to maintain determinism. If a source transmits more data to the switch than a particular virtual link allows, the switch can reject the data or drop the data. However, the switch is non-blocking for data transmitted at data rates within specific virtual link constraints.

ARINC 664 leverages inexpensive and ubiquitous Ethernet equipment to implement a deterministic network that provides highly reliable transmission within very specific time frames. Aircraft engine data, sensor data, control signals, etc., can be transmitted effectively at relatively low, but guaranteed rates. However, ARINC 664 does not allow for very efficient transmission of aperiodic, large block data flows such as large bulk file or log information transfers.

To allow for more efficient large file transfers, additional virtual link bandwidth may be allocated. However, it is often impractical and costly to allocate large amounts of additional bandwidth for occasional large block transfers as this reduces the bandwidth allotted to other functions even when the block transfers are not in progress. Some other systems provide for separate connections to data sources to allow for large block transfers. These separate connections may entail additional wiring, weight, and/or equipment to allow for aperiodic and sometimes infrequent access to particular files. Providing much of this additional infrastructure is inefficient.

Consequently, various embodiments of the present invention provide enhancements to aircraft data networks such as ARINC 664 to provide increased bandwidth for non-essential, non-critical data transfers in excess of the basic provisions of ARINC 664.

According to particular embodiments, instead of rate constraining bulk data transmitted from a source on a virtual link, the rate constraints for all non-essential low priority traffic are removed. Log files and large blocks of data can be transmitted to an ARINC 664 switch at rates and frequencies constrained only by an Ethernet physical layer and the ARINC 664 switch will not block or drop data based on ARINC 664 allocated bandwidth. However, the log files and large blocks of data that are non-rate constrained are associated with a lowest priority level so that the data imposes no additional delay on scheduled virtual links. The ARINC 664 switch would no longer police the ingress rate of the low priority virtual links and the source can transmit them at any rate. The ARINC 664 switch would only transmit this lowest priority traffic when there are no other scheduled messages to send. According to various embodiments, the low priority traffic creates no more delay than is currently seen in ARINC 664 networks, e.g. one message maximum, but whenever there is slack time with no regularly scheduled messages to transmit, the low priority traffic can consume all the available bandwidth.

In particular embodiments, an ARINC 664 network can be further enhanced by separating a particular network switch into two zones. The first zone may correspond to a conventional ARINC 664 network switch. The second zone may correspond to a standard Ethernet layer 2 switch. The second zone is also referred to herein as a maintenance region for transmission of maintenance related traffic such as core files, log files, etc., although the traffic does not need to be limited to maintenance. According to various embodiments, non-essential traffic, such as dataloads, would be connected to and routed through the maintenance region as fast as the physical layer allows whereas the parametric, scheduled traffic would connect to the ARINC 664 region and be scheduled and routed as usual.

Line Replaceable Units (LRU) using the increased non-essential traffic capabilities would provide an Ethernet end system to connect to the Maintenance switch region in addition to their ARINC 664 end system (if required). LRUs not using or having this capability maintain existing connections to the ARINC 664 region and continue to receive traffic with deterministic timing characteristics.

According to various embodiments, any non-essential traffic may be transferred between networks either through internal cross or external connections. The maintenance region traffic destined to traverse to the ARINC 664 region would ensure the correct virtual link and frequency restrictions are met. This way the traffic is only bandwidth and rate constrained for the last leg of its journey from the switch to the destination end system whereas the bulk of its transit is over the unconstrained maintenance region connections using Ethernet layer 2 switching.

In particular embodiments, the physical connection to the switch can be implemented in several ways. In some examples, the network switch LRUs have separate Ethernet connections for the ARINC 664 and maintenance regions. However, this may increase cabling, cost, and weight in implementations of switches having multiple regions. In some examples, an ARINC 664 switch uses multiplexing over fiber and optic cables in order to properly distribute traffic. According to various embodiments, each LRU would only have one switch connection but the traffic for the ARINC 664 and maintenance regions are on separate wavelengths and traffic is multiplexed such that they do not interfere. In particular embodiments, wave division multiplexing allows transmission of different types of data on different wavelengths as though each LRU is connected over multiple links.

Figure 1:
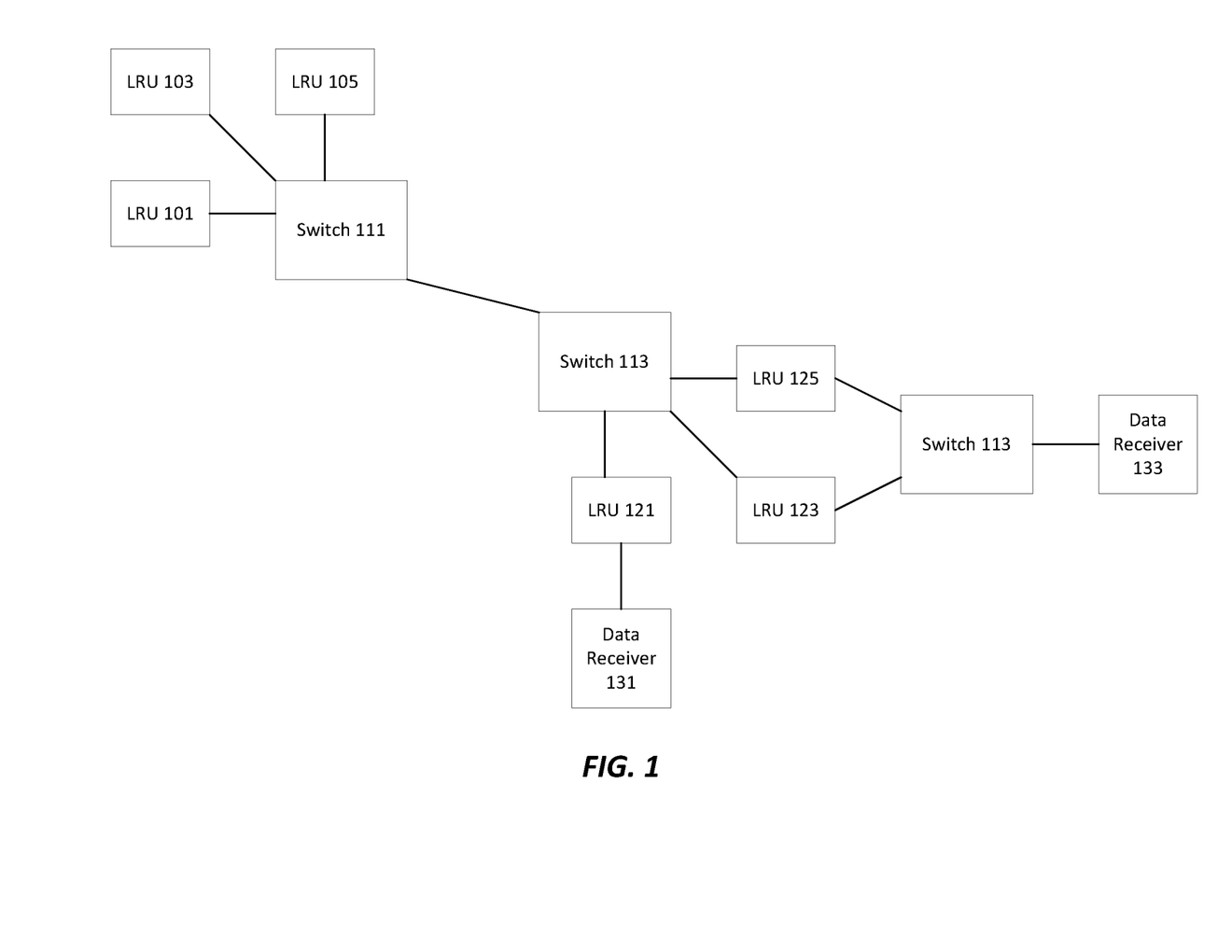
FIG. 1 illustrates one example of an ARINC 664 network having separate connections for large block transfers.

FIG. 1 illustrates one example of a deterministic aircraft data network having an ARINC 664 switch and various sources and destinations, also referred to herein as line replaceable units (LRUs), having connections to an ARINC 664 switch as well as separate connections. According to various embodiments, data sources are LRUs 101, 103, and 105 connected to switch 111. Examples of LRUs 101, 103, and 105 include components such as engine modules, sensor modules, and radio transceivers. LRUs are modular components of airplanes and ships that are designed to be replaced quickly at an operating location. LRUs make maintenance efficient because they are modular, thus reducing service costs. In particular embodiments, particular end points may be non-modular data sources. According to various embodiments, ARINC 664 switch 111 is connected to ARINC 664 switch 113. ARINC 664 switch 113 is connected to other LRUs 121, 123, and 125 to form a star topology network. It should be noted that other switches and LRUs and data sources and components can also be connected to this network.

According to various embodiments, LRUs 101, 103, and 105 are connected through ARINC 664 switches 111 and 113 to LRUs 121, 123, and 125 using Ethernet physical layers and virtual links. A virtual link may allow transmission of data from LRU 101 to LRUs 121 and 125 at specified data rates and frequencies associated with the virtual link. Another virtual link may allow transmission of data from LRU 123 to all of the other LRUs in the network at another specified data rate and frequency. Switches 111 and 113 are configured to police traffic on the various virtual links and block traffic that is transmitted in excess of what is allowed on the virtual links. Although this structure allows transmission of time critical data in a reliable and effective manner, virtual links do not allow efficient transmission of traffic bursts or large data blocks. Large data transfers are still restricted to virtual link defined rates and frequencies even though excess bandwidth may be available at the Ethernet physical layer.

Consequently, when large data transfers are required, additional connections may be established with various LRUs to allow more efficient data retrieval. In some examples, data receiver 131 may be directly connected to LRU 121 through dedicated links in order to retrieve log files. In some other examples, data receiver 133 may be connected to LRUs 123, and 125 through a separate network switch 141 configured specifically for burst type traffic. The separate network switch 141 may not be ARINC 664 compliant, but may be configured primarily for retrieval of large data blocks. However, having additional switches and networks increase the number of wire runs and increases overall aircraft weight and cost.

Figure 2A:
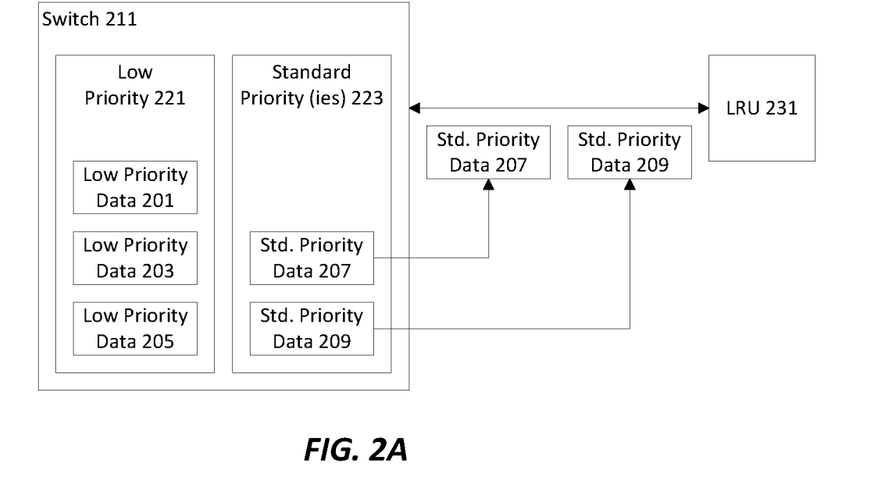
FIG. 2A-2C illustrates slack time maintenance at an ARINC 664 switch.
Figure 2B:
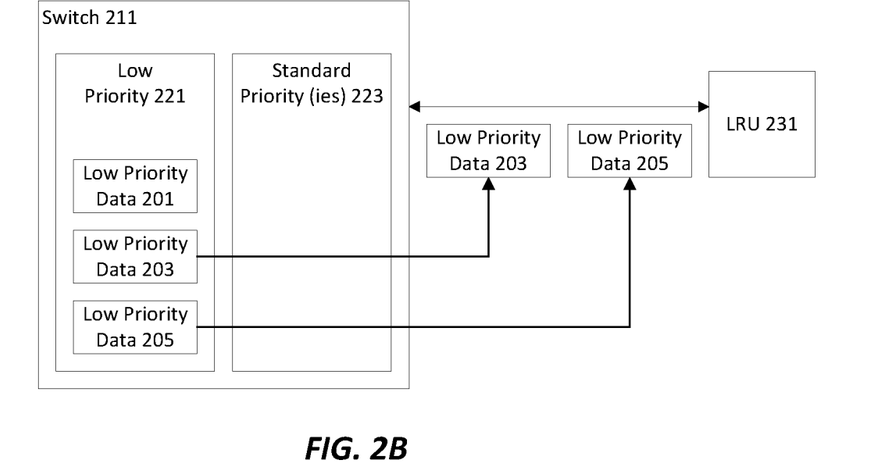
Figure 2C:
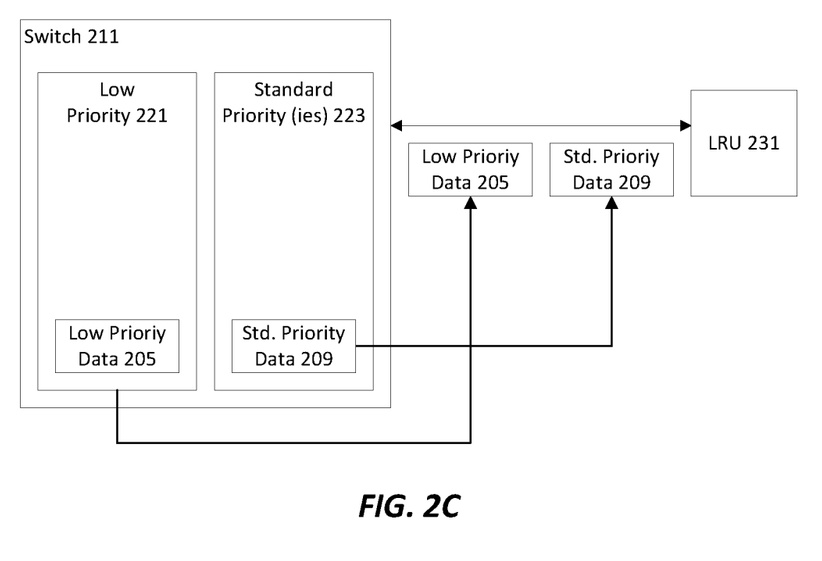

FIGS. 2A-2C illustrate various switch conditions that may occur upon handling different types of data. In FIG. 2A, according to various embodiments, switch 211 includes a low priority queue 221 and one or more standard priority queues 223. In particular embodiments, the standard priority queues 223 are normal priorities such that are rate constrained under ARINC 664. Regardless of whether the data 207 and data 209 are associated with virtual links having higher or lower frequencies and transmission rates, standard and normal priority queues 223 as used herein are rate constrained. Switch 211 polices standard priority data 207 and 209 to ensure that they fall within virtual link constraints. If they do not fall within virtual link constraints, standard priority data may be dropped.

By contrast, various of the embodiments of the present invention provide that low priority data 201, 203, and 205, is no longer rate constrained as required in conventional ARINC 664. However, low priority data 201, 203, and 205, typically maintenance data such as diagnostic, log, and core files, is assured of being transmitted only if no normal priority data is in the queue. Consequently, standard priority data 207 and 209 is transmitted to LRU 231 before any low priority data, even though standard priority queues 223 may also contain low priority, albeit rate constrained, data. By contrast, low priority queue 221 maintains only non-rate constrained data, i.e. data that is not limited by any virtual link related constraints.

FIG. 2B illustrates switch 211 state after rate constrained data associated with standard priority queue 223 has been transmitted. When no rate constrained data remains, non-rate constrained data 201, 203, and 205 can be transmitted at rates not associated with any virtual link, but at rates available via the Ethernet physical layer. In particular embodiments, low priority data 205 and low priority data 203 are transmitted to LRU 231. FIG. 2C illustrates switch 211 state when data resides in both low priority 221 and standard priority 223 queues. Rate constrained data 209 is transmitted before non-rate constrained data 205. All non-rate constrained data is transmitted only when rate constrained data has already been cleared from switch 211.

Figure 3:
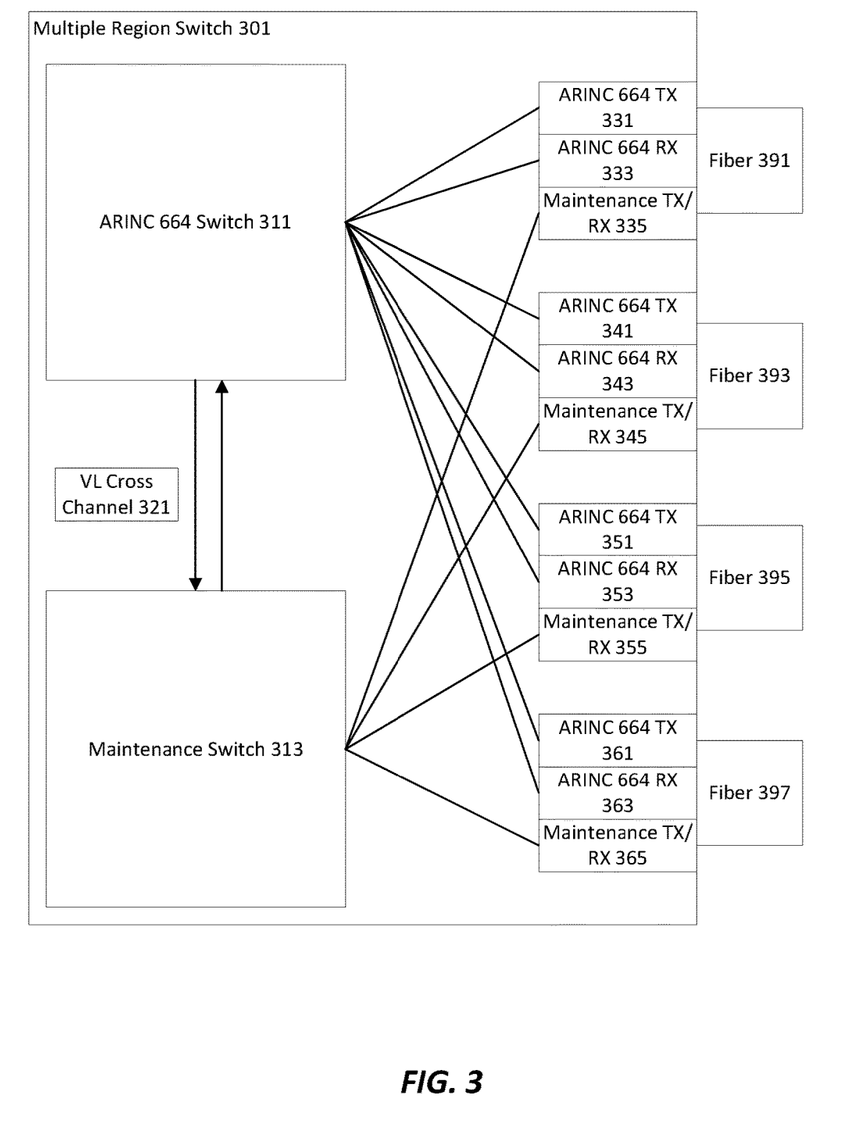
FIG. 3 illustrates one example of separation of a network switch into multiple zones using wave division multiplexing on fiber.

FIG. 3 illustrates one example of implementing a multiple region switch 301. A multiple region switch 301 includes both a conventional ARINC 664 compliant switch 311 as well as a maintenance switch 313. In particular embodiments, it should be noted that although switch 313 is referred to herein as a maintenance switch, switch 313 can handle any type of aperiodic bursty traffic. According to particular embodiments, maintenance switch 313 and ARINC 664 switch 311 are implemented in a single physical network switch 301. A virtual link (VL) cross channel 321 is provided to allow traffic between maintenance switch 313 and ARINC 664 switch 311. For example, maintenance switch traffic may needed to be provided to ARINC 664 switch 331 if a particular receiving entity cannot handle traffic from multiple region switches. The ARINC 664 region can also include the low priority queue described above in a hybrid switch approach. Maintenance switch 313 is configured to transmit and receive maintenance data over ports 335, 345, 355, and 365 associated with fiber channels 391, 393, 395, and 397 respectively. ARINC 664 switch 311 is configured to transmit any rate constrained data over ARINC 664 transmit ports 331, 341, 351, and 361 respectively. ARINC 664 switch 311 is configured to receive any rate constrained data over ARINC 664 receive ports 333, 343, 353, and 363. ARINC 664 switch region 311 operates like any ARINC 664 switch. Maintenance switch 313 operates like any Ethernet switch.

Maintenance traffic such as dataloads would be connected to and routed through maintenance region switch 313 as fast as the physical layer allows. Parametric, scheduled traffic that is rate constrained over conventional ARINC 664 virtual links would connect to the ARINC 664 switch 311 and be scheduled and routed as usual. Line Replaceable Units (LRU) using the increased non-essential traffic capabilities would provide an Ethernet end system to connect to the Maintenance switch region in addition to their ARINC 664 end system. LRU not using this capability maintain existing connections to the ARINC 664 region.

In some examples, maintenance traffic being sent to an LRU without an Ethernet end system would have to be sent over VL cross channel 321 to ARINC 664 switch 311. The traffic could then be routed to the LRU using conventional ARINC 664 mechanisms. It should be noted that internal VL cross channels or external connections can be provided. The maintenance region traffic destined to traverse to the ARINC 664 region through ARINC 664 switch 311 would ensure the correct virtual link and frequency restrictions are met. This way the traffic is only bandwidth and routing constrained for the last leg of its journey from the switch to the destination end system whereas the bulk of its transit may be over the unconstrained maintenance region connections in multiple region compliant switches.

According to various embodiments, physical connections can be accomplished by having separate physical Ethernet links through fiber connections 391, 393, 395, and 397. However, this requires additional infrastructure but may be conceptual simpler. In particular embodiments, multiplexing is used to transmit rate constrained and non-rate constrained traffic over the same fiber connections 391, 393, 395, and 397. According to particular embodiments wave division multiplexing over fiber optics is used such that each LRU would only have one switch connection but the traffic for the ARINC 664 and maintenance regions are on separate wavelengths such that they do not interfere.

Figure 4:
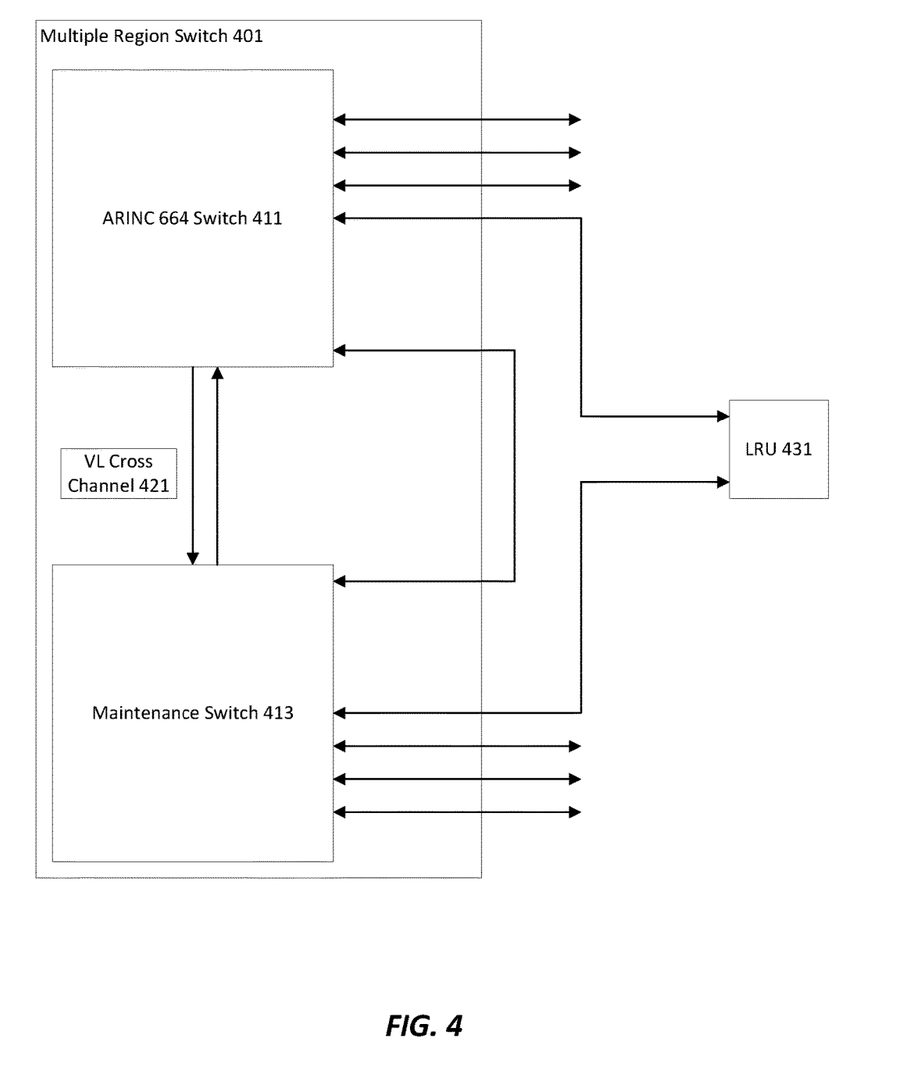
FIG. 4 illustrates one example of a network switch separated into multiple zones connected over copper wire.

FIG. 4 illustrates one example of implementing a multiple region switch 401 over copper. A multiple region switch 401 includes both a conventional ARINC 664 compliant switch 411 as well as a maintenance switch 413. In particular embodiments, it should be noted that although switch 413 is referred to herein as a maintenance switch, switch 413 can handle any type of aperiodic bursty traffic. Any type of aperiodic bursty traffic is referred to herein as maintenance traffic. According to particular embodiments, maintenance switch 413 and ARINC 664 switch 411 are implemented in a single physical network switch 401. A virtual link cross channel 421 is provided to allow traffic between maintenance switch 413 and ARINC 664 switch 411. For example, maintenance switch traffic may needed to be provided to ARINC 664 switch 431 if a particular receiving entity cannot handle traffic from multiple region switches. Maintenance switch 413 is configured to transmit and receive maintenance data over copper to entities including LRU 431.

Maintenance traffic such as dataloads would be connected to and routed through maintenance region switch 413 as fast as the physical layer allows. Parametric, scheduled traffic that is rate constrained over conventional ARINC 664 virtual links would connect to the ARINC 664 switch 411 and be scheduled and routed as usual. Line Replaceable Units (LRU) using the increased non-essential traffic capabilities would provide an Ethernet end system to connect to the Maintenance switch region in addition to their ARINC 664 end system. LRU not using this capability maintain existing connections to the ARINC 664 region.

In some examples, maintenance traffic being sent to an LRU without an Ethernet end system would have to be sent over VL cross channel 421 to ARINC 664 switch 411. The traffic could then be routed to the LRU using conventional ARINC 664 mechanisms. It should be noted that internal VL cross channels or external connections can be provided. The maintenance region traffic destined to traverse to the ARINC 664 region through ARINC 664 switch 411 would ensure the correct virtual link and frequency restrictions are met. This way the traffic is only bandwidth and routing constrained for the last leg of its journey from the switch to the destination end system whereas the bulk of its transit may be over the unconstrained maintenance region connections in multiple region compliant switches.

According to various embodiments, physical connections can be accomplished by having separate physical Ethernet links through copper connections. However, this requires additional infrastructure but may be conceptual simpler. In particular embodiments, multiplexing is used to transmit rate constrained and non-rate constrained traffic over the same copper connections. According to particular embodiments, wave division multiplexing over fiber optics is used such that each LRU would only have one switch connection but the traffic for the ARINC 664 and maintenance regions are on separate wavelengths such that they do not interfere.

Figure 5:
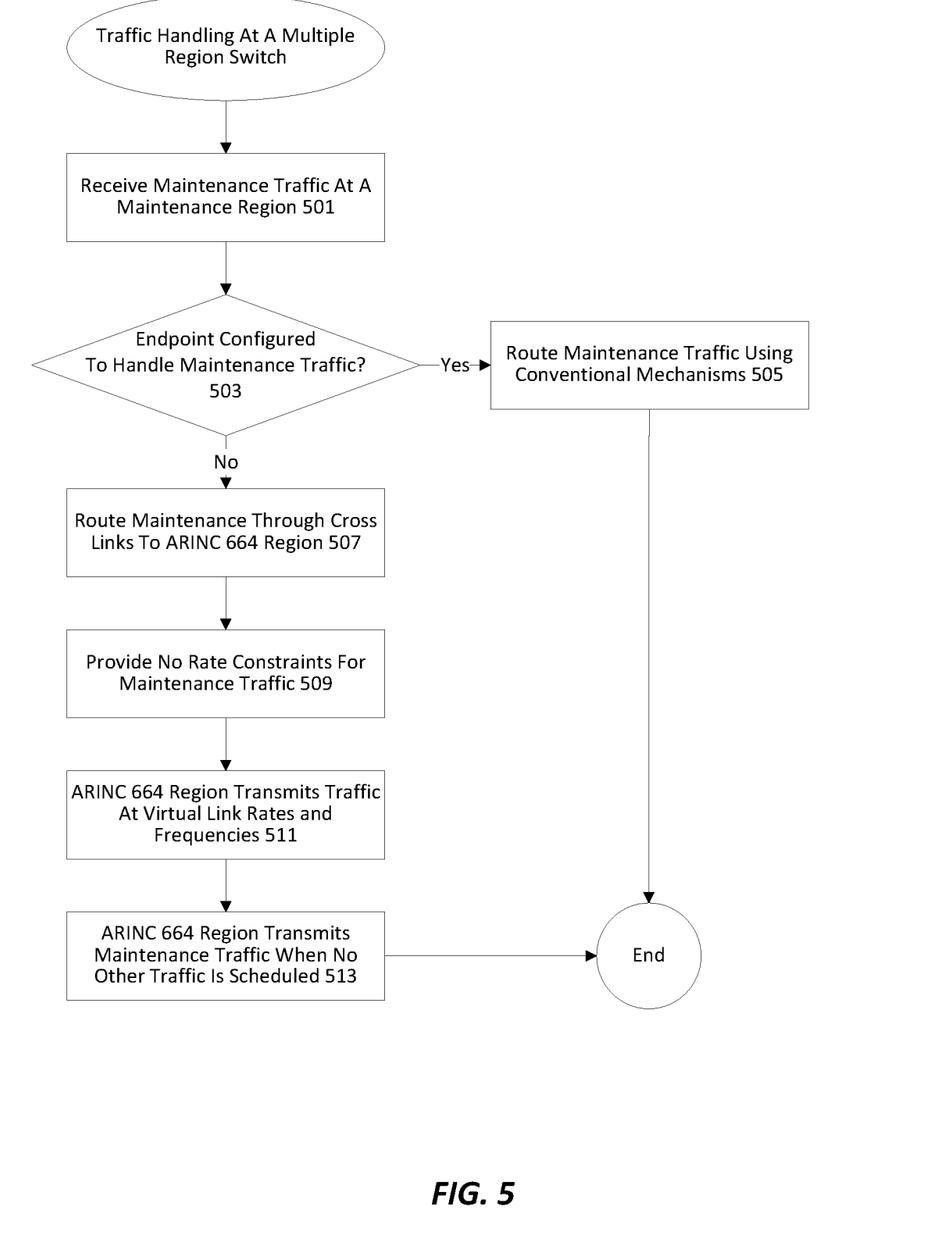
FIG. 5 illustrates one example of many possible process flows for improving deterministic aircraft data network bandwidth.

FIG. 5 illustrates one example of a technique for data handling at an aircraft data network switch. At 501, an aircraft data network switch such as an ARINC 664 switch receives maintenance traffic at a maintenance region. At 503, it is determined if an endpoint or LRU specified in the maintenance traffic is configured to handle maintenance traffic. If the endpoint or LRU is configured to handle maintenance traffic, the maintenance traffic is routed using conventional Ethernet routing mechanisms at 505. However, if the endpoint or LRU is determined to a switch that is not configured to handle maintenance traffic, the maintenance traffic is routed to the ARINC 664 region at 507. According to various embodiments, a switch that does not handle or does not have sufficient support for the various types of maintenance traffic that may be transmitted is referred to herein as having insufficient support for maintenance traffic. The ARINC 664 region may receive this maintenance traffic from the maintenance region or from other upstream devices. According to various embodiments, the ARINC 664 region maintains no rate constraints for maintenance traffic at 509. The ARINC 664 region transmits virtual link traffic at rates and frequencies specified by corresponding to the various virtual links at 511. The ARINC 664 region transmits maintenance traffic when no other traffic is scheduled for transmission at 513.

Figure 6:
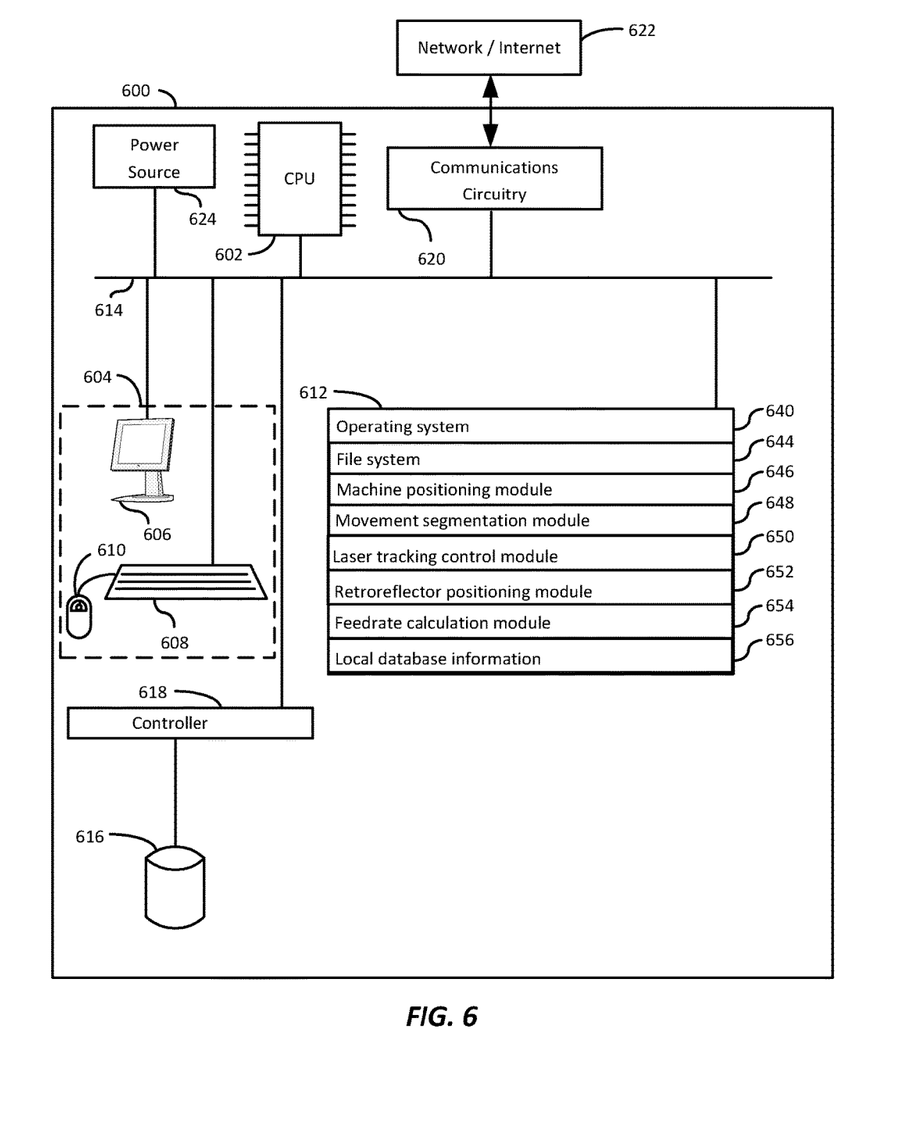
FIG. 6 is a block diagram illustrating an example of a computer system capable of implementing various processes described in the present disclosure.

FIG. 6 is a block diagram illustrating an example of a computer system 600 capable of implementing various aircraft data networks and aircraft data network switches such as ARINC 664 switches described in the present disclosure. The system 600 typically includes a power source 624; one or more processing units (CPU's) 602 for executing modules, programs and/or instructions stored in memory 612 and thereby performing processing operations; one or more network or other communications circuitry or interfaces 620 for communicating with a network 622; controller 618; and one or more communication buses 614 for interconnecting these components. In some embodiments, network 622 may be a wireless and/or wired network. In some embodiments, processing units 602 may function as a process controller. In some embodiments, network 622 can be another communication bus, the Internet, an Ethernet, an Intranet, other wide area networks, local area networks, and metropolitan area networks. Communication buses 614 optionally include circuitry (sometimes called a chipset) that interconnects and controls communications between system components. System 600 optionally includes a user interface 604 comprising a display device 606, a keyboard 608, and a mouse 610.

Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices 616 remotely located from the CPU(s) 602.

Memory 612, or alternately the non-volatile memory device(s) within memory 612, comprises a non-transitory computer readable storage medium. In some embodiments, memory 612, or the computer readable storage medium of memory 612 stores the following programs, modules and data structures, or a subset thereof:

- an operating system 640 that includes procedures for handling various basic system services and for performing hardware dependent tasks;
- a file system 644 for storing various program files;
- a machine control module 646 for determining machine positions, and/or regulating machine movement 503;
- a movement segmentation module 648 for segmenting the movement of the machine into segments 507 defining an incremental movement of the machine;
- a laser tracker control module 650 for controlling operation of a laser measurement system, to illuminate a retroreflector and determine real-time machine positions by receiving and measuring light reflected from the retroreflector, such as in operations 511 and 513;

a retroreflector positioning module 652 for determining the movement required for one or more positioners to steer the retroreflector at various points of a segment 507;

a feedrate calculation module 654 for determining the maximum allowable machine feedrate by utilizing various algorithms, such as equation 529; and local database information 656 comprising operating parameters, measurements, machine attributes, retroreflector attributes, laser measurement system attributes and/or other network messages.

Various implementations of the present disclosure may exclude a combination of one or more of the above identified elements. Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above.

Although FIG. 6 shows a "system for optical endpoint control optimization," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement an optical endpoint control optimization system and how features are allocated among them will vary from one implementation to another, and may depend in part on the amount of data traffic that the system must handle during peak usage periods as well as during average usage periods.

Examples of Aircraft and Methods of Fabricating and Operating Aircraft

Figure 7:
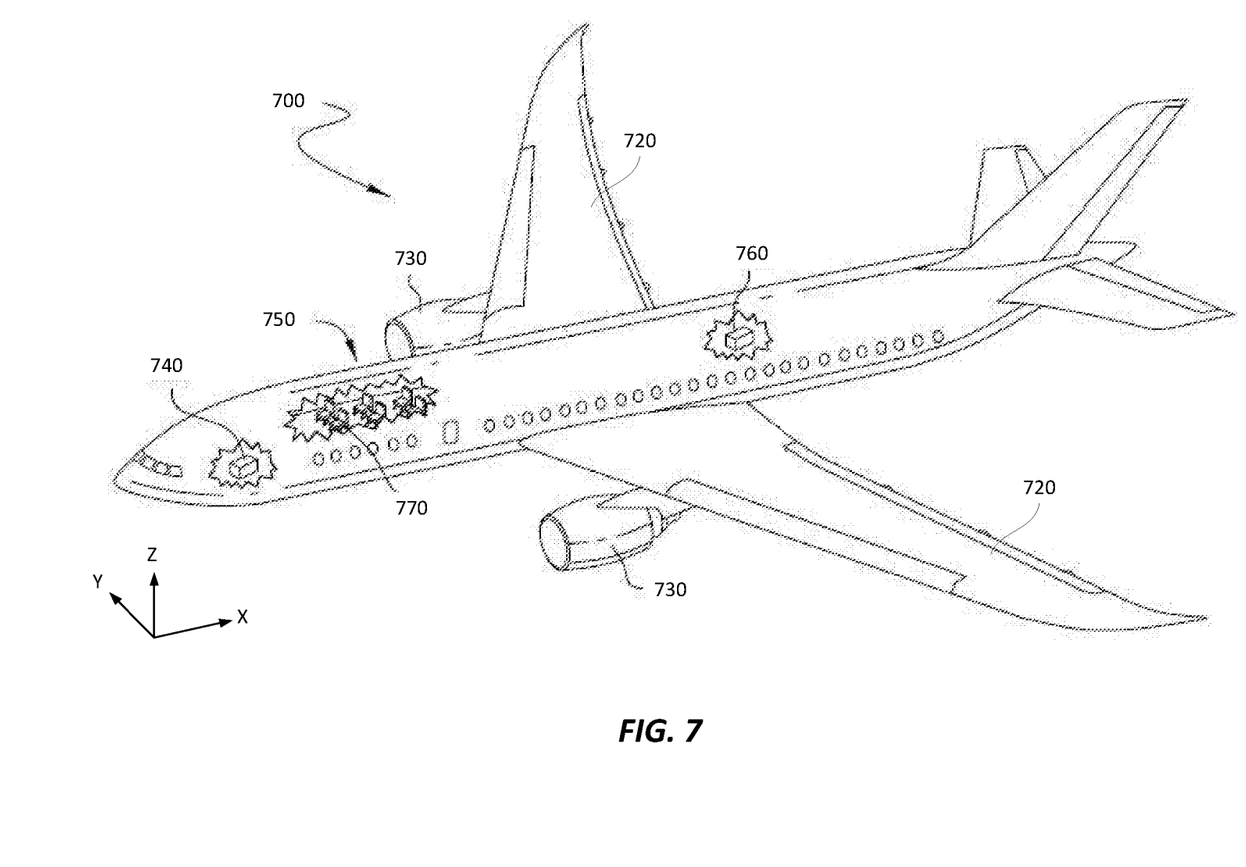
FIG. 7 is a schematic illustration of an aircraft, in accordance with some embodiments.

To better understand various aspects of implementation of the described systems and techniques, a brief description of an aircraft and aircraft wing is now presented. FIG. 7 is a schematic illustration of aircraft 700 that may use an aircraft data network, in accordance with various embodiments. As depicted in FIG. 7, aircraft 700 is defined by a longitudinal axis (X-axis), a lateral axis (Y-axis), and a vertical axis (Z-axis). In various embodiments, aircraft 700 comprises airframe 750 with interior 770. Aircraft 700 includes wings 720 coupled to airframe 750. Aircraft 700 may also include engines 730 supported by wings 720. In some embodiments, aircraft 700 further includes a number of high-level inspection systems such as electrical inspection system 740 and environmental inspection system 760. In other embodiments, any number of other inspection systems may be included.

Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

Figure 8:
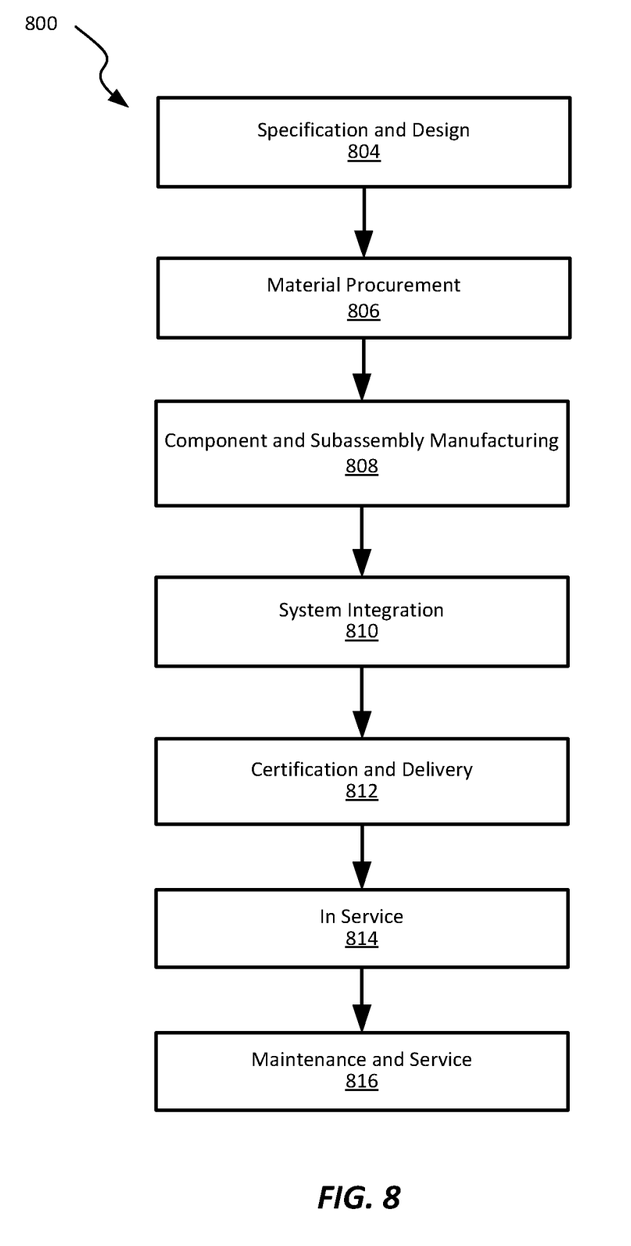
FIG. 8 is a block diagram of aircraft production and service methodology that may utilize methods and assemblies described herein.

Examples of the present disclosure may be described in the context of aircraft manufacturing and service method 800 as shown in FIG. 8 and aircraft 700 as shown in FIG. 7. During pre-production, illustrative method 800 may include specification and design (block 804) of aircraft 700 and material procurement (block 806). During production, component and subassembly manufacturing (block 808) and inspection system integration (block 810) of aircraft 700 may take place. Described methods, and assemblies formed by these methods, can be used in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described methods, and assemblies formed by these methods, can be used in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 800). For example, components or subassemblies corresponding to component and subassembly manufacturing (block 808) may be fabricated or manufactured in a manner similar to components or subassemblies produced while aircraft 700 is in service (block 814). Also, one or more examples of the apparatus(es), method(s), or combination thereof may be utilized during production stages (block 808) and (block 810), for example, by substantially expediting assembly of or reducing the cost of aircraft 700. Similarly, one or more examples of the apparatus or method realizations, or a combination thereof, may be utilized, for example and without limitation, while aircraft 700 is in service (block 814) and/or during maintenance and service (block 816).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be

What is claimed is:

1. A method comprising:
   receiving maintenance traffic at a maintenance region in an aircraft data network multiple region switch;
   determining that an endpoint associated with the maintenance traffic at the maintenance region provides insufficient support for the maintenance traffic;
   routing the maintenance traffic through cross links to an ARINC 664 region in the aircraft data network multiple region switch;
   releasing rate constraints for the maintenance traffic in the ARINC 664 region; and
   transmitting the maintenance traffic when the ARINC 664 region is free of virtual link traffic, wherein the maintenance traffic is transmitted to the aircraft data network multiple region switch.

2. The method of claim 1, further comprising receiving the virtual link traffic in the ARINC 664 region, wherein the virtual link traffic received in the ARINC 664 region is rate constrained.

3. The method of claim 1, further comprising receiving the virtual link traffic in the ARINC 664 region, wherein the virtual link traffic received in the ARINC 664 region is associated with multiple priorities.

4. The method of claim 3, wherein the maintenance traffic is associated with a lowest priority.

5. The method of claim 1, wherein the maintenance region transmits the maintenance traffic to other endpoints configured to handle the maintenance traffic.

6. The method of claim 1, wherein the aircraft data network multiple region switch is configured in a single physical network switch.

7. The method of claim 1, wherein the ARINC 664 region is connected to a plurality of ARINC transmit and receive ports.

8. The method of claim 1, wherein the maintenance region has unconstrained virtual link rates.

9. The method of claim 1, wherein the ARINC 664 region is constrained by a plurality of virtual link rates.

10. A system comprising:
    an input interface configured to receive maintenance traffic at a maintenance region in an aircraft data network multiple region switch;
    a processor configured determine that an endpoint associated with the maintenance traffic at the maintenance region provides insufficient support for the maintenance traffic, the processor is further configured to route the maintenance traffic through cross links to an ARINC 664 region in the aircraft data network multiple region switch, wherein rate constraints are released for the maintenance traffic in the ARINC 664 region; and
    an output interface configured to transmit the maintenance traffic when the ARINC 664 region is free of virtual link traffic, wherein the maintenance traffic is transmitted to the aircraft data network multiple region switch.

11. The system of claim 10, wherein the input interface is further configured to receive the virtual link traffic in the ARINC 664 region, wherein the virtual link traffic received in the ARINC 664 region is rate constrained.

12. The system of claim 10, wherein the input interface is further configured to receive the virtual link traffic in the ARINC 664 region, wherein the virtual link traffic received in the ARINC 664 region is associated with multiple priorities.

13. The system of claim 12, wherein the maintenance traffic is associated with a lowest priority.

14. The system of claim 10, wherein the maintenance region transmits the maintenance traffic to other endpoints configured to handle the maintenance traffic.

15. The system of claim 10, wherein the aircraft data network multiple region switch is configured in a single physical network switch.

16. The system of claim 10, wherein the ARINC 664 region is connected to a plurality of ARINC transmit and receive ports.

17. The system of claim 10, wherein the maintenance region has unconstrained virtual link rates.

18. The system of claim 10, wherein the ARINC 664 region is constrained by a plurality of virtual link rates.

19. A non-transitory computer readable medium comprising:
    computer code for receiving maintenance traffic at a maintenance region in an aircraft data network multiple region switch;
    computer code for determining that an endpoint associated with the maintenance traffic at the maintenance region provides insufficient support for the maintenance traffic;
    computer code for routing the maintenance traffic through cross links to an ARINC 664 region in the aircraft data network multiple region switch;
    computer code for releasing rate constraints for the maintenance traffic in the ARINC 664 region; and
    computer code for transmitting the maintenance traffic when the ARINC 664 region is free of virtual link traffic, wherein the maintenance traffic is transmitted to the aircraft data network multiple region switch.

20. The non-transitory computer readable medium of claim 19, further comprising computer code for receiving the virtual link traffic in the ARINC 664 region, wherein the virtual link traffic received in the ARINC 664 region is rate constrained.

* * * * *